United States Patent
Yoshida

(10) Patent No.: US 8,405,858 B2
(45) Date of Patent: Mar. 26, 2013

(54) INFORMATION PROCESSOR, IMAGE READING SYSTEM HAVING THE SAME, AND COMPUTER READABLE MEDIUM FOR THE SAME

(75) Inventor: Akidi Yoshida, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 482 days.

(21) Appl. No.: 12/729,554

(22) Filed: Mar. 23, 2010

(65) Prior Publication Data
US 2010/0245907 A1    Sep. 30, 2010

(30) Foreign Application Priority Data
Mar. 30, 2009    (JP) ................. 2009-082940

(51) Int. Cl.
G06F 15/00 (2006.01)
G06F 12/00 (2006.01)
(52) U.S. Cl. .......................... 358/1.15; 726/19
(58) Field of Classification Search ............ 358/1.15
See application file for complete search history.

(56) References Cited

U.S. PATENT DOCUMENTS

| | | | |
|---|---|---|---|
| 6,167,462 A | 12/2000 | Davis et al. | |
| 7,099,023 B2 | 8/2006 | Chrisop et al. | |
| 2002/0067224 A1* | 6/2002 | Wen | 333/118 |
| 2004/0128555 A1 | 7/2004 | Saitoh et al. | |
| 2006/0236366 A1* | 10/2006 | Walczyk | 726/1 |
| 2010/0188684 A1 | 7/2010 | Kumara | |

FOREIGN PATENT DOCUMENTS

| JP | HEI 05-153414 | 6/1993 |
|---|---|---|
| JP | 2007-195005 A | 8/2007 |
| JP | 2008-259138 A | 10/2008 |

OTHER PUBLICATIONS

Notification of Reasons for Rejection dated Dec. 6, 2011 received from the Japanese Patent Office from related Japanese Application No. 2010-069361 and U.S. Appl. No. 12/731,569, together with an English-language translation.
U.S. Office Action dated Aug. 16, 2012, received in related U.S. Appl. No. 12/731,569.

\* cited by examiner

Primary Examiner — Saeid Ebrahimi Dehkordy
(74) Attorney, Agent, or Firm — Scully, Scott, Murphy & Presser, PC

(57) ABSTRACT

An information processor, which is configured to be connected communicably with an image reader, includes a display unit, an image receiver configured to receive image data from the image reader, a storage controller configured to store the received image data into a first storage area that is assigned to the storage controller, an acceptor configured to, in response to the storage controller storing the received image data into the first storage area, accept a display instruction to display the received image data, a transfer unit configured to, in response to the acceptor accepting the display instruction, transfer the received image data from the first storage area into a second storage area different from the first storage area, and a display controller configured to display, on the display unit, the received image data stored in the second storage area that is assigned to the display controller.

15 Claims, 7 Drawing Sheets

INFORMATION PROCESSOR, IMAGE READING SYSTEM HAVING THE SAME, AND COMPUTER READABLE MEDIUM FOR THE SAME

CROSS-REFERENCE TO RELATED APPLICATION

This application claims priority under 35 U.S.C. §119 from Japanese Patent Application No. 2009-082940 filed on Mar. 30, 2009. The entire subject matter of the application is incorporated herein by reference.

BACKGROUND

1. Technical Field

The following description relates to one or more techniques to read an image from a document sheet, create image data based on the read image, and display an image based on the created image data.

2. Related Art

An image reading system has been known in which scanned image data is exchanged between a personal computer (PC) and a scanner. In addition, a technique for the image reading system has been proposed, which technique is adapted to prevent information contained in a confidential document from leaking.

SUMMARY

In the image reading system proposed, when a push scan process is performed, a scanned image may be displayed on a monitor of the PC, depending on settings for an application on the PC. It is noted that in the push scan process, when operations for scanning an image and generating image data of the scanned image are performed at the side of the scanner, the image data is, after transmitted to the PC, received by a scanner driver of the PC and then transferred from the scanner driver to the application in the PC. Under such settings that the scanned image is displayed on the monitor of the PC, in a situation where a user is not near the PC, the scanned image displayed on the monitor might be looked at by a third party and it might result in leak of information contained in the scanned image.

Aspects of the present invention are advantageous to provide one or more improved techniques that make it possible to prevent information, which is contained in a scanned image acquired in a scan process, from leaking to a third party.

According to aspects of the present invention, an information processor is provided, which is configured to be connected communicably with an image reader. The information processor includes a display unit, an image receiver configured to receive image data from the image reader, a storage controller configured to store the received image data into a first storage area that is assigned to the storage controller, an acceptor configured to, in response to the storage controller storing the received image data into the first storage area, accept a display instruction to display the received image data, a transfer unit configured to, in response to the acceptor accepting the display instruction, transfer the received image data from the first storage area into a second storage area different from the first storage area, and a display controller configured to display, on the display unit, the received image data stored in the second storage area that is assigned to the display controller.

In some aspects of the present invention, it is possible to control whether to display the received image data on the display unit, based on whether the received image data has been transferred from the first storage area into the second storage area. Therefore, regardless of whether the display controller employs a specific control technique, it is possible to certainly control whether to display the received image data on the display unit. Thus, it is possible to enhance a capability of protecting confidential information contained in the received image data.

According to aspects of the present invention, further provided is an image reading system, which includes an image reader, and an information processor configured to be connected communicably with the image reader. The image reader includes a start instruction acceptor configured to accept a start instruction to start creating image data, an image data creator configured to, in response to the start instruction acceptor accepting the start instruction, read an image from a document sheet and create image data based on the read image, and an image data transmitter configured to transmit the created image data to the information processor. The information processor includes a processor-side display unit, an image receiver configured to receive the image data transmitted by the image reader, a storage controller configured to store the received image data into a first storage area that is assigned to the storage controller, an acceptor configured to, in response to the storage controller storing the received image data into the first storage area, accept a display instruction to display the received image data, a transfer unit configured to, in response to the acceptor accepting the display instruction, transfer the received image data from the first storage area into a second storage area different from the first storage area, and a display controller configured to display, on the processor-side display unit, the received image data stored in the second storage area that is assigned to the display controller.

In some aspects of the present invention, the image reading system configured as above can provide the same effects as the aforementioned information processor.

According to aspects of the present invention, further provided is a computer readable medium having instructions stored thereon. When executed by a processor that is provided with a display unit and configured to be connected communicably with an image reader, the instructions cause the processor to perform an image receiving step of receiving image data from the image reader, a storage controlling step of storing the received image data into a first storage area that is assigned to the storage controlling step, an accepting step of, in response to the received image data being stored into the first storage area in the storage controlling step, accepting a display instruction to display the received image data, a transferring step of, in response to acceptance of the display instruction in the accepting step, transferring the received image data from the first storage area into a second storage area different from the first storage area, and a display controlling step of displaying, on the display unit, the received image data stored in the second storage area that is assigned to the display controlling step.

In some aspects of the present invention, the computer readable medium configured as above can provide the same effects as the aforementioned information processor and the image reading system.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described with reference to the accompany drawings.

Figure 1:
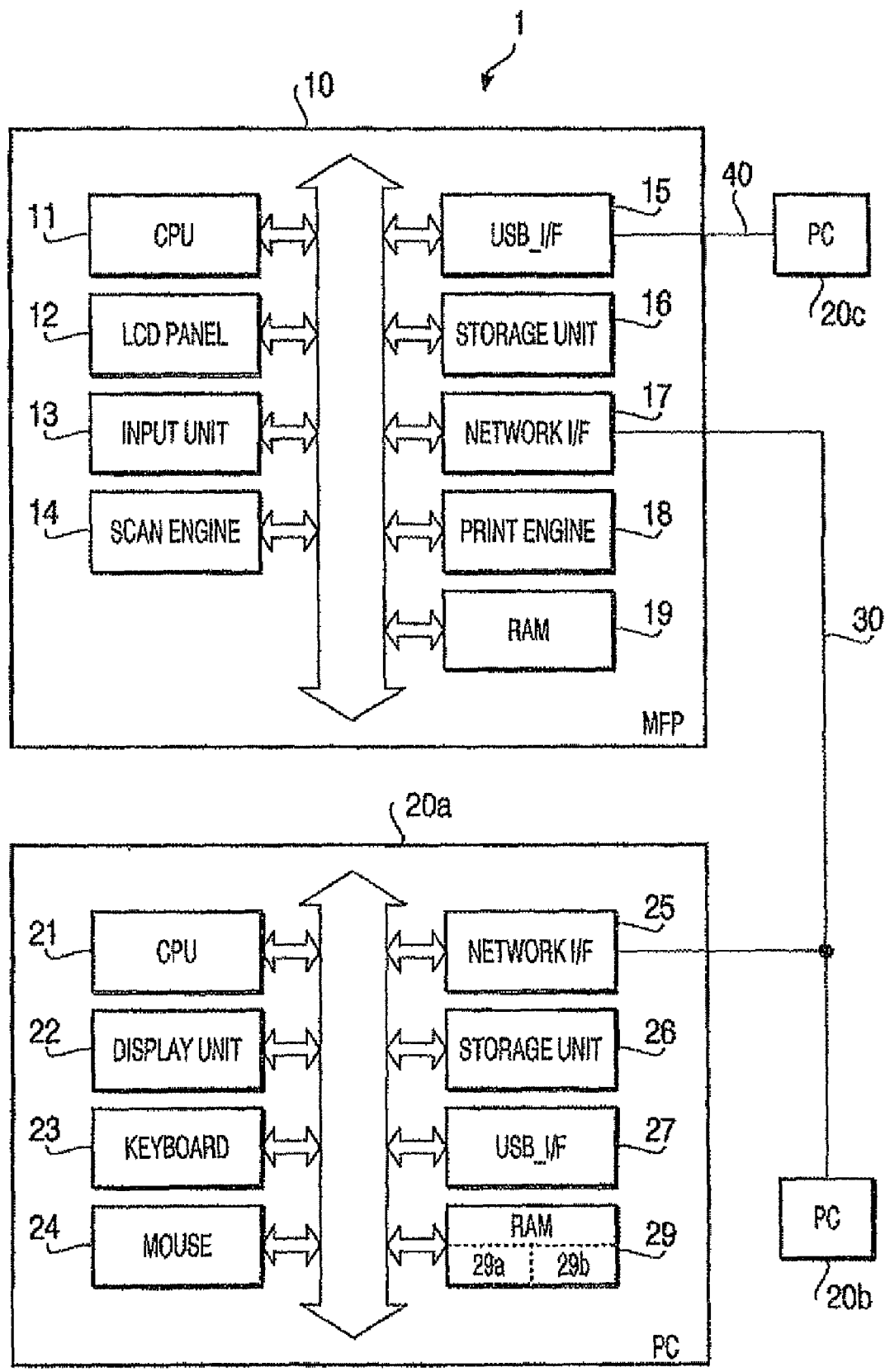
FIG. 1 is a block diagram schematically showing a configuration of an image reading system in accordance with one or more aspects of the present invention.

As shown in FIG. 1, an image reading system 1 of a first embodiment includes a multi-function peripheral (MFP) 10 having various functions (e.g., a printer function, a scanner function, a copy function, and a facsimile function), and personal computers (PCs) 20a, 20b, and 20c. The MFP 10 is connected with the PCs 20a and 20b via a LAN 30. In addition, the MFP 10 is connected with the PC 20c via a USB 40.

A detailed configuration of the MFP 10 will be described. The MFP 10 includes a CPU 11, a liquid crystal display (LCD) panel 12, an input unit 13, a scan engine 14, a USB interface (I/F) 15, a storage unit 16, a network interface (I/F) 17, a print engine 18, and a RAM 19. The above elements are interconnected via a bus. The storage unit 16 is configured with a non-volatile storage medium such as a ROM, a hard disk drive, and a flash memory. The storage unit 16 is employed as a storage area to store data to be utilized for realizing each function of the MFP 10. The CPU 11 performs various processes based on programs stored on the storage unit 16. The RAM 19 has memory spaces configured such that the CPU 11 writes data thereinto and reads data therefrom. The LCD panel 12 displays various kinds of information. The input unit 13 is configured with a mechanical switch and a touch panel so as to accept an input from a user. The scan engine 14 is configured to, based on a command from the CPU 11, read an image on a document sheet set in a predetermined reading position and create image data. The USB I/F 15 is configured to perform a communication process for achieving communication with a USB-enabled device (in the first embodiment, the PC 20c) based on a USB standard. The network I/F 17 communicates with devices (in the first embodiment, the PCs 20a and 20b) on the LAN 30. The print engine 18 prints an image on a printing medium in accordance with a command from the CPU 11.

Subsequently, a detailed configuration of the PC 20a will be described. The PC 20a includes a CPU 21, a display unit 22, a keyboard 23, a mouse 24, a network I/F 25, a storage unit 26, a USB I/F 27, and a RAM 29. The above elements are interconnected via a bus. The storage unit 26 stores various kinds of software such as an operating system (OS), various application programs, and device drivers for controlling the MFP 10. As examples of the application programs, an image display application such as photo processing software, a word-processor application, and a spreadsheet application are cited. Additionally, as examples of the device drivers, a scanner driver for controlling the scan engine 14 and a printer driver for controlling the print engine 18 are cited. The CPU 21 performs processes based on various kinds of software stored on the storage unit 26.

The RAM 29 has memory spaces configured such that the CPU 21 writes data thereinto and reads data therefrom. The memory spaces are secured separately in association with each kind of software. For instance, when the scanner driver and the image display application are executed by the CPU 21, a memory space 29a assigned to the scanner driver and a memory space 29b assigned to the image display application are secured within the RAM 29.

The display unit 22 is configured to display various kinds of information. The keyboard 23 is a known keyboard that accepts an input from the user. The mouse 24 is a known mouse that accepts an input from the user. The network I/F 25 is configured to perform communication with a device (in the first embodiment, the MFP 10) on the LAN 30. The USB I/F 27 is configured to perform a communication process for achieving communication with a USB-enabled device (in the first embodiment, the MFP 10) based on the USB standard. It is noted that since configurations of the PCs 20b and 20c are the same as that of the PCa, explanations about the configurations of the PCs 20b and 20c will be omitted.

Figure 2:
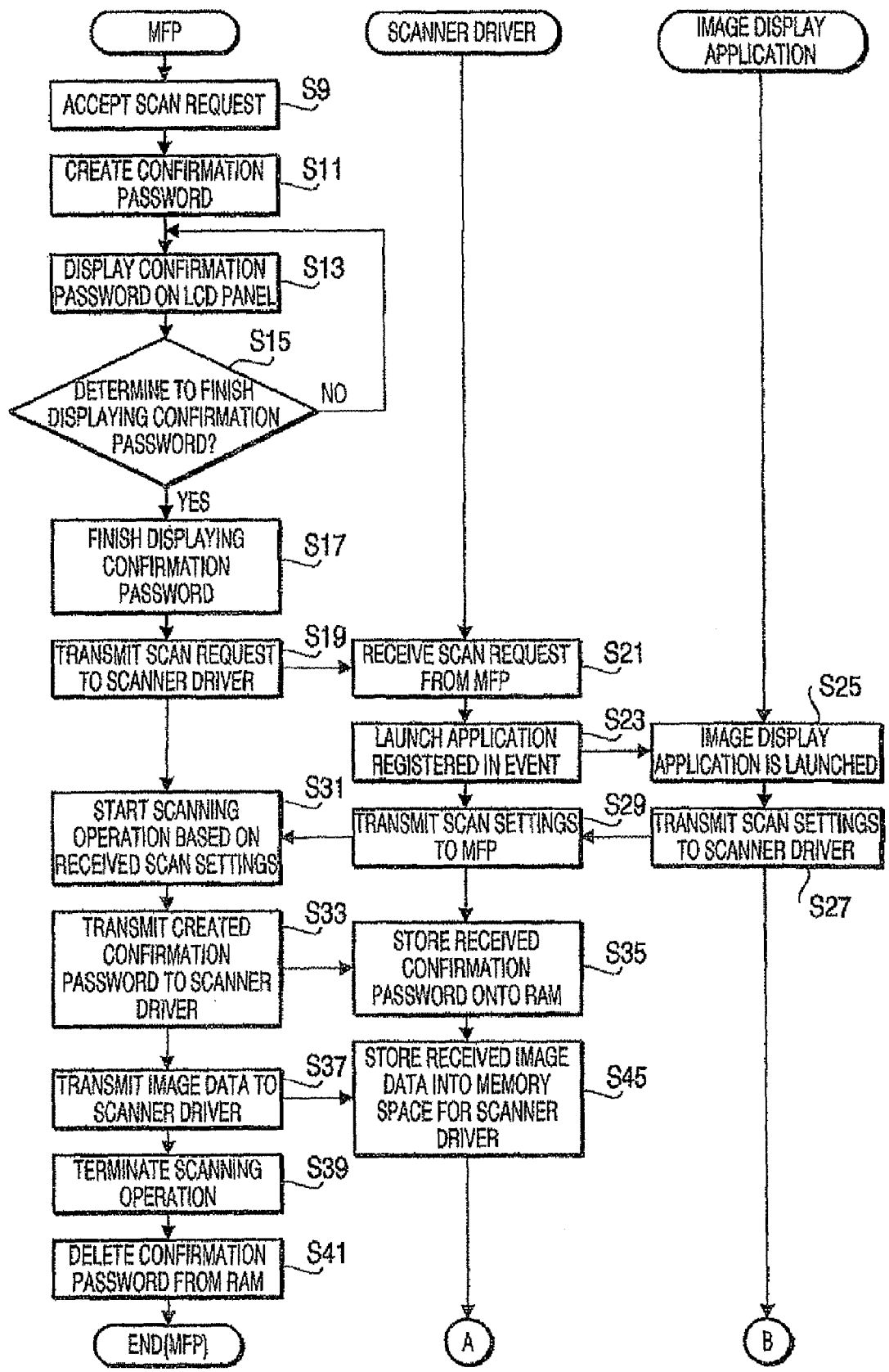
FIGS. 2 and 3 are flowcharts showing a procedure of a push scan process to be performed by the image reading system in accordance with one or more aspects of the present invention.
Figure 3:
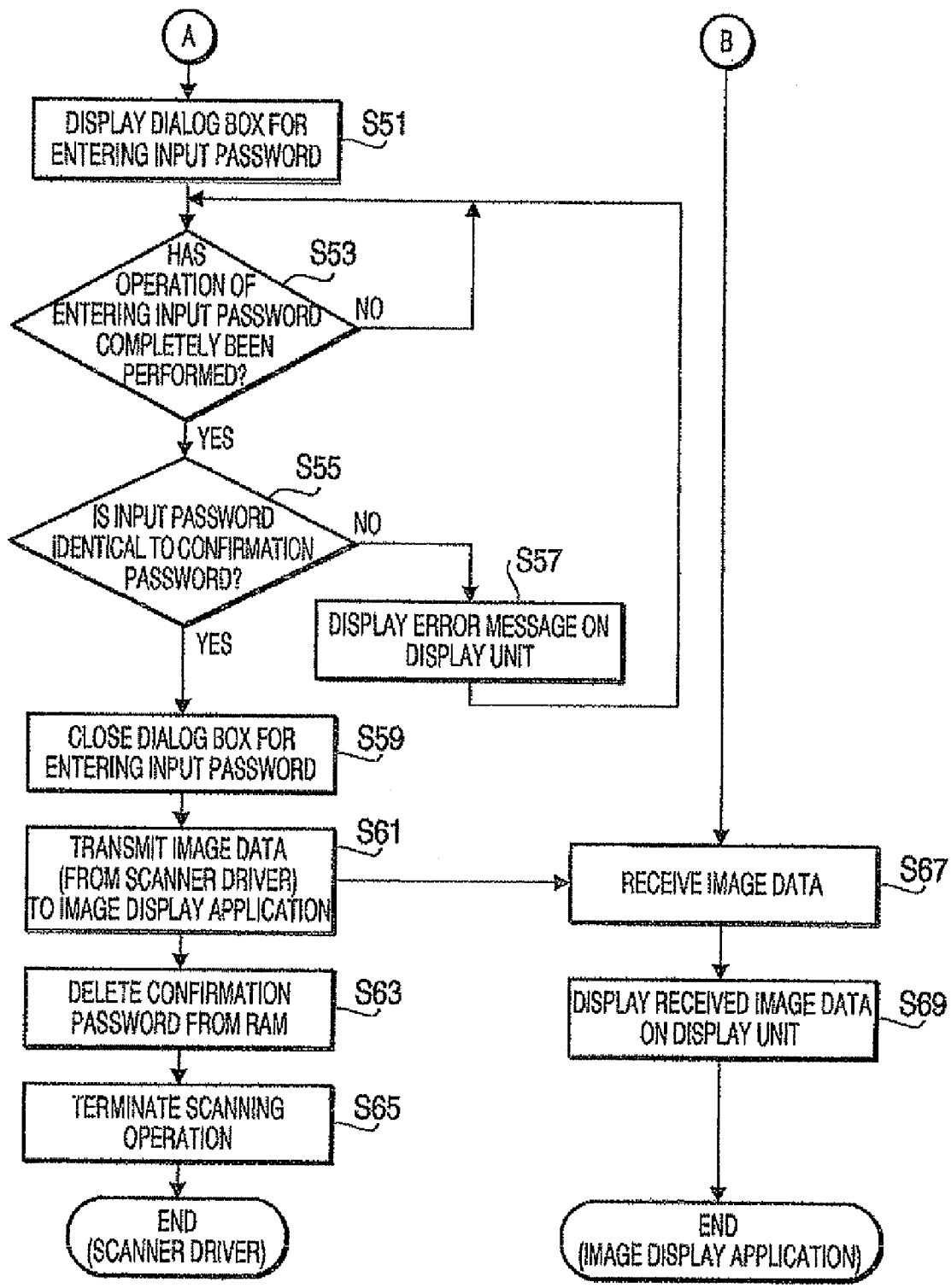
Figure 4:
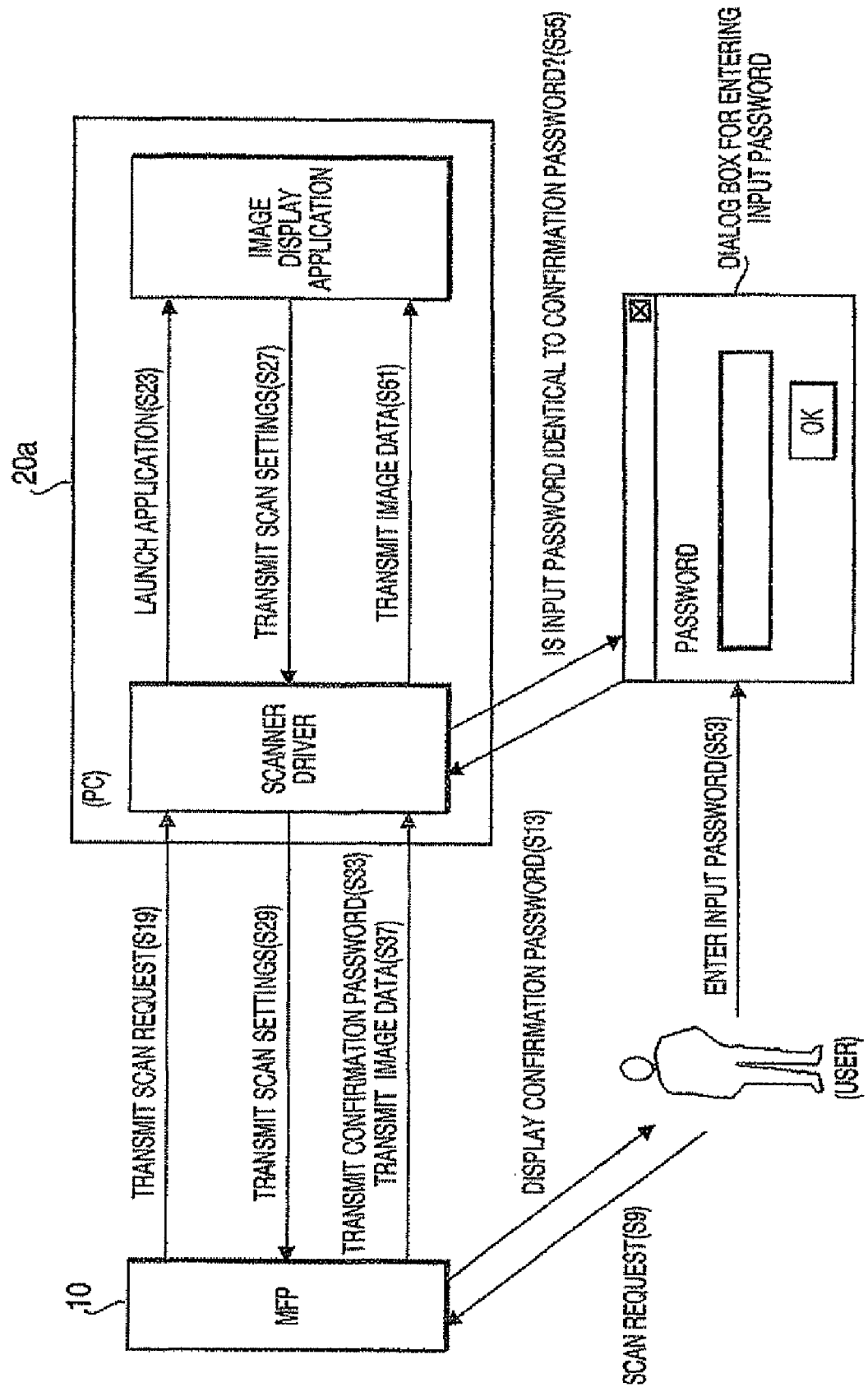
FIG. 4 is a sequence diagram showing the procedure of the push scan process in accordance with one or more aspects of the present invention.

An explanation will be provided about a push scan process to be performed by the image reading system 1 with reference to FIGS. 2 to 4. In the following description, an example case where image data created by the MFP 10 is transmitted to the PC 20a via the LAN 30 will be set forth.

Referring to FIGS. 2 and 4, an explanation will be provided about operations performed after the MFP 10 starts a scanning operation until the PC 20a receives the created image data. In S9, when the user sets a document sheet on the MFP 10, and inputs a scan request with selection of the PC 20a as a destination of the image data, the CPU 11 accepts the input of the scan request (S9). It is noted that the operations of inputting the scan request and selecting the destination of the image data are performed through the input unit 13. As an example of the operation of inputting the scan request, a user operation is cited of touching a button "Start Scanning" displayed on the touch panel of the input unit 13 to input the scan request. Further, as an example of the operation of selecting the destination of the image data, a user operation is cited of touching a button to make a selection between the PC 20a and the PC 20c which button is displayed on the touch panel of the input unit 13.

In S11, the CPU 11 creates a confirmation password and stores the confirmation password on the RAM 19 (S11). The confirmation password is a password offered to the user. Further, it is noted that a different password is newly created each time as the confirmation password. As an example of a method for creating the confirmation password, a method is cited in which a different character string is randomly assigned each time. Thereby, since a different password is created as the confirmation password each time the scan request is input, it is possible to enhance a capability of protecting confidential information.

In S13, the CPU 11 displays the created confirmation password on the LCD panel 12 (S13). In S15, the CPU 11 determines whether to finish displaying the confirmation password (S15). Specifically, the CPU 11 determines that the CPU 11 is to finish displaying the confirmation password, in response to a lapse of a predetermined time period or an operation of pressing an "OK" button being detected. When determining not to finish displaying the confirmation password (S15: No), the CPU 11 goes back to S13 to keep displaying the confirmation password. Meanwhile, when determining to finish displaying the confirmation password (S15: Yes), the CPU 11 goes to S17, in which the CPU 11 finishes displaying the confirmation password (S17).

In S19, the CPU 11 transmits a scan request to the scanner driver of the PC 20a via the LAN 30 (S19). In S21, the scanner driver receives the scan request from the MFP 10 (S21). In S23, the scanner driver launches an application registered in an event (S23). The application has previously been registered in the event, e.g., by the user. In the first embodiment, the following explanation will be provided under an assumption that the image display application is registered in the event. In S25, the image display application stored on the storage unit 26 is launched (S25).

In S27, the image display application transmits scan settings to the scanner driver (S27). The scan settings include various settings such as a setting of a resolution of scanned image data and a setting of an image size. In S29, the scanner driver transmits, to the MFP 10, the scan settings which the scanner driver receives from the image display application (S29). In S31, the CPU 11 of the MFP 10 starts the scanning operation based on the scan settings received (S31). In the scanning operation, a document sheet set in the reading position is read, and image data is created.

In S33, the CPU 11 transmits the created confirmation password to the scanner driver of the PC 20a (S33). In S35, the scanner driver receives the confirmation password from the MFP 10 and stores the confirmation password onto the RAM 29 (S35).

In S37, the CPU 11 of the MFP 10 transmits the created image data to the scanner driver of the PC 20a (S37). In S45, the scanner driver receives the image data from the MFP 10, and then stores the received image data into the memory space 29a for the scanner driver that is secured within the RAM 29 and assigned to the scanner driver (S45).

In S39, the CPU 11 of the MFP 10 terminates the scanning operation. Then, the CPU 11 goes to S41, in which the CPU 11 deletes the confirmation password stored on the RAM 19 (S41).

Subsequently, referring to FIGS. 3 and 4, an explanation will be provided about operations to be executed by the PC 20a after receipt of the image data. In S51, the scanner driver displays a dialog box for entering an input password on the display unit 22 (S51). The input password denotes a password input by the user. In addition, as an example of the dialog box, a dialog box provided with a password entry field and an "OK" button is cited.

In S53, the scanner driver determines whether an operation of entering an input password has completely been performed (S53). The input password may be input, e.g., via the keyboard 23. The determination as to whether an operation of entering an input password is completely performed may be made, e.g., based on whether the "OK" button has been pressed. When determining that an operation of entering an input password has not completely been performed (S53: No), the scanner driver goes back to S53 and waits for the operation of entering the input password to be completely performed. Meanwhile, when determining that an operation of entering an input password has completely been performed (S53: Yes), the scanner driver stores the input password onto the RAM 29, and then goes to S55.

In S55, the scanner driver determines whether the input password input by the user is identical to the confirmation password transmitted by the MFP 10 (S55). Specifically, the scanner driver reads out the confirmation password and the input password from the RAM 29, and compares the both passwords with each other. When determining that the input password input by the user is not identical to the confirmation password transmitted by the MFP 10 (S55: No), the scanner driver goes to S57, in which the scanner driver displays on the display unit 22 an error message that the input password is not identical to the confirmation password (S57). Meanwhile, when determining that the input password input by the user is identical to the confirmation password transmitted by the MFP 10 (S55: Yes), the scanner driver goes to S59, in which the scanner driver closes the dialog box for entering the input password (S59). Thereafter, the scanner driver goes to S61.

In S61, the scanner driver transmits the image data to the image display application (S61). In S67, the image display application receives the image data from the scanner driver (S67). Thereby, the image data is completely transferred from the scanner driver to the image display application. Specifically, the transfer of the image data is carried out by copying the image data, which is stored in the memory space 29a for the scanner driver within the RAM 29, into the memory space 29b for the image display application within the RAM 29. It is noted that instead of being copied, the image data may be moved from the memory space 29a for the scanner driver into the memory space 29b for the image display application. The image display application cannot display the image data on the display unit 22 until (a copy of) the image data is stored into the memory space 29b for the image display application.

In S69, the image display application displays the received image data on the display unit 22 (S69). Then, the image display application terminates the scanning operation.

Meanwhile, the scanner driver deletes the confirmation password from the RAM 29 (S63). Then, the scanner driver goes to S65, in which the scanner driver terminates the scanning operation (S65).

According to the image reading system 1 of the first embodiment, it is possible to control whether to display image data on the display unit 22 based on whether the image data has been transmitted by the scanner driver to the image display application. Therefore, regardless of whether the image display application has a specific function for controlling whether to display the image data, it is possible to make the scanner driver certainly control whether to display the image data. Thereby, it is possible to enhance a capability of protecting confidential information contained in the image data.

Further, according to the image reading system 1 of the first embodiment, only one or more limited users, who know a predetermined confirmation password, are permitted to display an image read by the MFP 10 on the display unit 22 of the PC 20a. Hence, even though a user leaves the PC 20a to retrieve from the MFP 10 a document sheet that has completely scanned, it is possible to prevent the created image data from being looked at by a third party while the user is leaving the PC 20a. Additionally, since the user can wait by the MFP 10 until a scanning operation is completely performed, it is possible to prevent a scanned document sheet from being looked at by a third party. Accordingly, it is possible to further enhance a capability of protecting confidential information contained in the scanned image.

Figure 5:
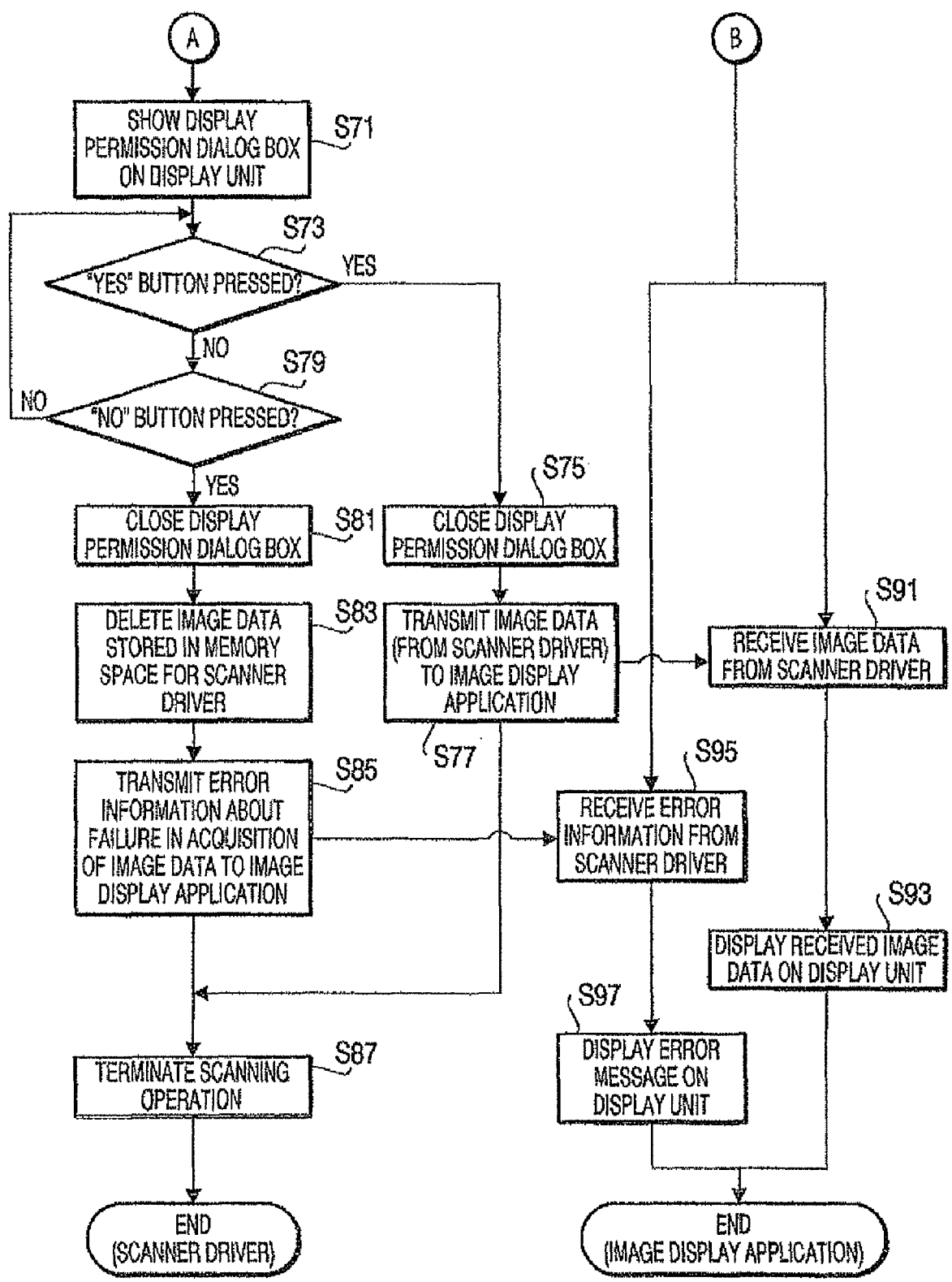
FIG. 5 is a flowchart showing a process to be performed in a second embodiment according to one or more aspects of the present invention.

Next, a second embodiment according to aspects of the present invention will be described with reference to FIG. 5. In the aforementioned first embodiment, a display instruction to display the image data on the display unit 22 is issued in response to the input password being input (see S51 to S55). In the second embodiment, the display instruction is issued based on a selection between "Yes" and "No." Further, in the second embodiment, a flowchart shown in FIG. 5 is employed instead of the flowchart shown in FIG. 3 in the first embodiment. It is noted that since the configuration of the image reading system 1 shown in FIG. 1 and the flowchart shown in FIG. 2 are common to the first embodiment and the second embodiment, detailed explanations about the configuration of the image reading system 1 and the flowchart shown in FIG. 2 will be omitted.

In S71, the scanner driver shows a display permission dialog box on the display unit 22 (S71). The display permission dialog box includes a confirmation message to see whether to display on the display unit 22 the image data created by the MFP 10 and Yes/No buttons.

In S73, the scanner driver determines whether the "Yes" button has been pressed (S73). The "Yes" button may be pressed, e.g., through the mouse 24 or the keyboard 23. When determining that the "Yes" button has been pressed (S73: Yes), the scanner driver goes to S75.

In S75, the scanner driver closes the display permission dialog box (S75). In S77, the scanner driver transmits the image data to the image display application (S77). Then, in S91, the image display application receives the image data from the scanner driver (S91). Thereby, operations of transmitting/receiving the image data are completed. In S93, the image display application displays the received image data on the display unit 22 (S93). Then, the image display application terminates the scanning operation.

Meanwhile, when determining in S73 that the "Yes" button has not been pressed (S73: No), the scanner driver goes to S79. In S79, the scanner driver determines whether the "No" button has been pressed (S79). When determining that the "No" button has not been pressed (S79: No), the scanner driver goes back to S73 to wait for any of the "Yes" button and the "No" button to be pressed. When determining that the "No" button has been pressed (S79: Yes), the scanner driver goes to S81.

In S81, the scanner driver closes the display permission dialog box (S81). In S83, the scanner driver deletes the image data stored in the memory space 29a for the scanner driver within the RAM 29 (S83). In S85, the scanner driver transmits to the image display application error information about failure in acquisition of the image data (S85). Then, the scanner driver goes to S87, in which the scanner driver terminates the scanning operation.

In S95, the image display application receives the error information (about failure in acquisition of the image data) from the scanner driver (S95). In S97, the image display application displays on the display unit 22 an error message that the image display application does not display the image data (S97). Then, the image display application terminates the scanning operation.

As described above, according to the image reading system 1 in the second embodiment, the determination as to whether to display on the display unit 22 the image data created by the MFP 10 can be made based on the selection between the "Yes" button and the "No" button. Thus, it is possible to enhance user-friendliness of the image reading system 1.

Figure 6:
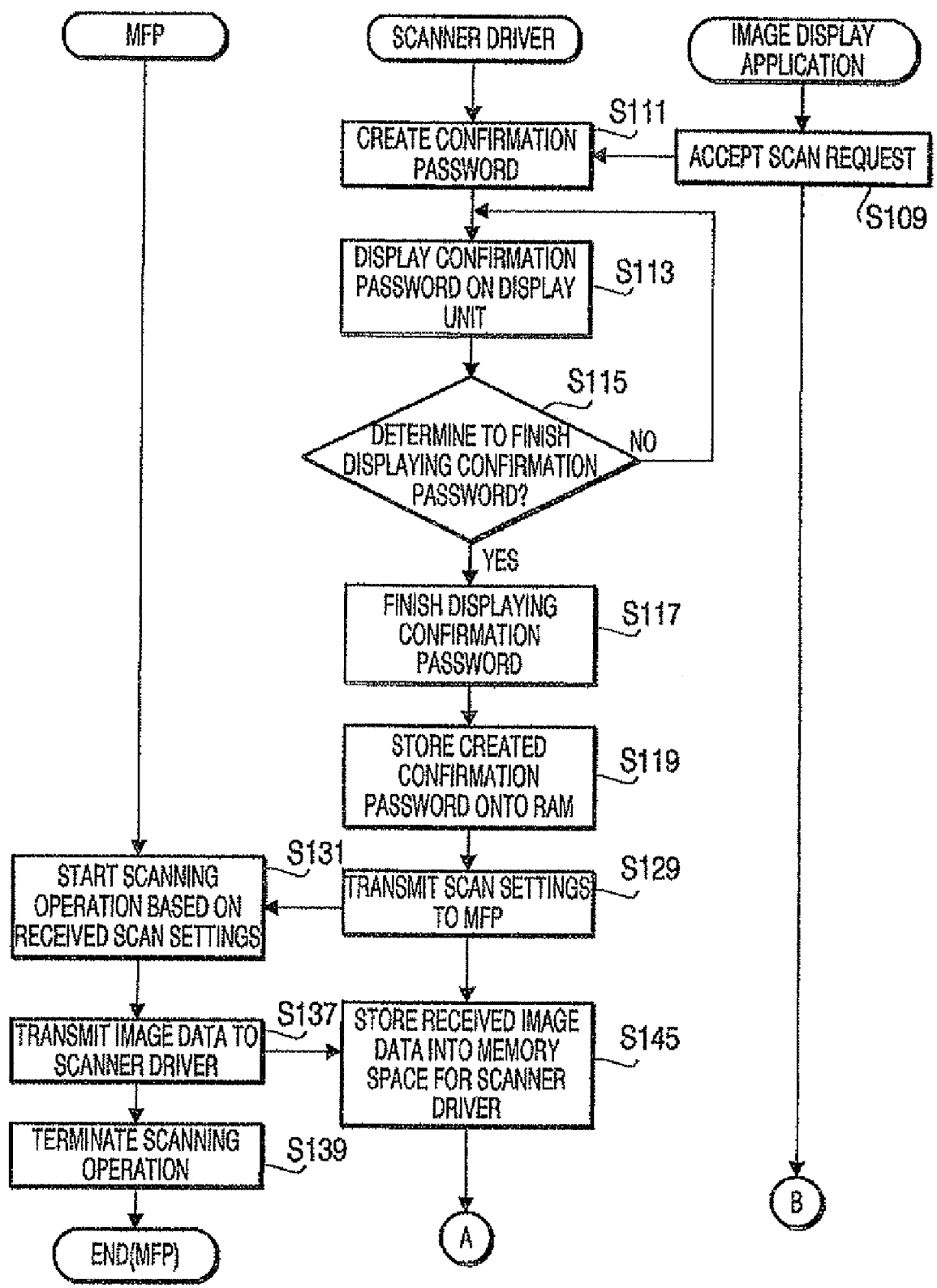
FIG. 6 is a flowchart showing a procedure of a pull scan process to be performed in a third embodiment according to one or more aspects of the present invention.
Figure 7:
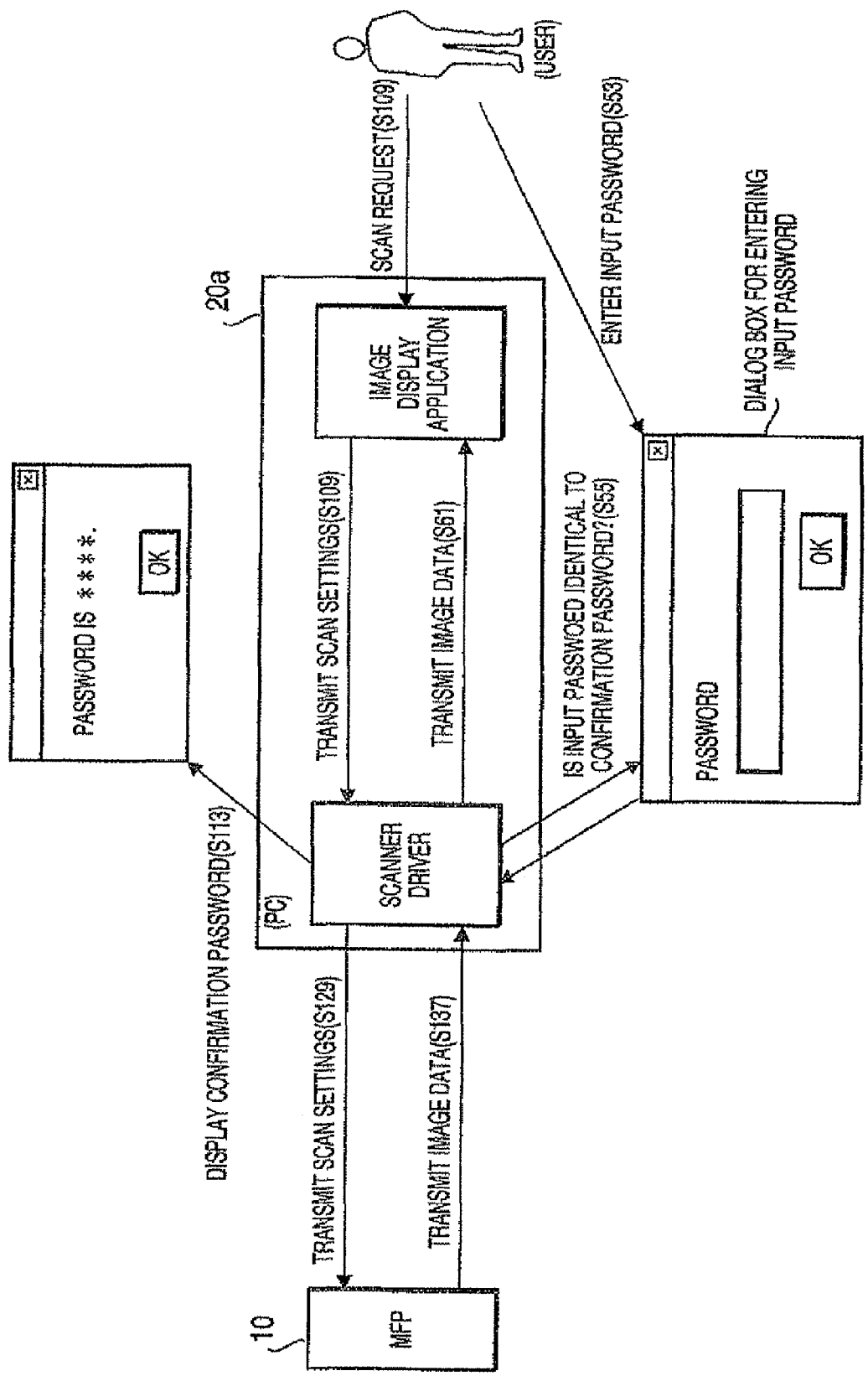
FIG. 7 is a sequence diagram is a sequence diagram showing the procedure of the pull scan process to be performed in the third embodiment according to one or more aspects of the present invention.

Subsequently, a third embodiment according to aspects of the present invention will be described with reference to FIGS. 6 and 7. In the aforementioned first embodiment, the push scan process in which a scan request is accepted at the side of the MFP 10 has been described. In the third embodiment, a pull scan process in which a scan request is accepted at the side of the PC 20a will be described. Further, in the third embodiment, a flowchart shown in. FIG. 6 is employed instead of the flowchart shown in FIG. 2 in the first embodiment. It is noted that since the configuration of the image reading system 1 shown in FIG. 1 and the flowchart shown in FIG. 3 are common to the first embodiment and the third embodiment, detailed explanations about the configuration of the image reading system 1 and the flowchart shown in FIG. 3 will be omitted.

In S109, the user inputs a scan request using the image display application, the image display application accepts the input of the scan request (S109). At this time, the image display application transmits scan settings to the scanner driver.

In S111, the scanner diver creates a confirmation password (S111). It is noted that a method for creating the confirmation password is the same as the method in the first embodiment. Therefore, a detailed explanation about the method will be omitted.

In S113, the scanner driver displays the created confirmation password on the display unit 22 (S113). In S115, the scanner driver determines whether to finish displaying the confirmation password (S115). When determining not to finish displaying the confirmation password (S115: No), the scanner driver goes back to S113 to keep displaying the confirmation password. Meanwhile, when determining to finish displaying the confirmation password (S115: Yes), the scanner driver goes to S117, in which the scanner driver finishes displaying the confirmation password on the display unit 22 (S117).

In S119, the scanner driver stores the created confirmation password onto the RAM 29. In S129, the scanner driver transmits to the MFP 10 the scan settings transmitted by the image display application. In S131, the CPU 11 of the MFP 10 starts a scanning operation based on the received scan settings (S131).

In S137, the CPU 11 of the MFP 10 transmits the created image data to the scanner driver of the PC 20a (S137). In S145, the scanner driver receives the image data from the MFP 10 and stores the received image data into the memory space 29a for the scanner driver within the RAM 29 (S145). Further, in S139, the CPU 11 of the MFP 10 terminates the scanning operation. It is noted that the following operations are the same as those in the first embodiment. Therefore, an explanation about the following operations will be omitted.

As described above, according to the image reading system 1 in the third embodiment, even in the pull scan process in which a scan request is accepted at the side of the PC 20a, each time a scan request is input, a different confirmation password is created. Thus, it is possible to further enhance a capability for the image reading system 1 to protect confidential information.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned first embodiment, in S51, the dialog box for entering the input password is displayed on the display unit 22. At this time, for instance, a dialog box may concurrently be displayed to inform that the document sheet should be withdrawn from the MFP 10. Thereby, it is possible to prevent the document sheet from remaining left on the MFP 10. Thus, it is possible to further enhance a capability for the image reading system 1 to protect confidential information contained in the document sheet.

In the aforementioned first embodiment, in S13, the created confirmation password is displayed on the LCD panel 12 of the MFP 10. However, for instance, the created confirmation password may be printed by the MFP 10. Thereby, the user may not be required to memorize the confirmation password. Thus, it is possible to enhance user-friendliness of the image reading system 1. It is noted that even though the printed password leaks to a third party, since a different confirmation password is created each time a scan request is input, it is possible to maintain the capability of protecting confidential information.

What is claimed is:

1. An information processor configured to be connected communicably with an image reader, comprising:
   a display unit;
   an image receiver configured to receive image data from the image reader;
   a storage controller configured to store the received image data into a first storage area that is assigned to the storage controller;
   an acceptor configured to, in response to the storage controller storing the received image data into the first storage area, accept a display instruction to display the received image data;
   a transfer unit configured to, in response to the acceptor accepting the display instruction, transfer the received image data from the first storage area into a second storage area different from the first storage area;
   a display controller configured to display, on the display unit, the received image data stored in the second storage area that is assigned to the display controller;
   a request acceptor configured to accept a request to create image data;
   a password creator configured to, in response to request acceptor accepting the request, create a confirmation password, wherein the password creator is adapted to create a different confirmation password each time the request acceptor accepts a request to create image data;
   a password display controller configured to display the created confirmation password on the display unit; and
   a start instruction transmitter configured to, in response to acceptor accepting the request, transmit to the image reader a start instruction to start creating image data,
   wherein the transfer unit is configured to, when the input password is identical to the created confirmation password, transfer the received image data from the first storage area into the second storage area.

2. The information processor according to claim 1, wherein the transfer unit is configured to, in response to the acceptor accepting the display instruction, perform one of moving the image data stored in the first storage area into the second storage area and copying the image data stored in the first storage area into the second storage area.

3. The information processor according to claim 1, further comprising a password receiver configured to receive a confirmation password from the image reader,
   wherein the acceptor is configured to accept an input password as the display instruction to display the received image, and
   wherein the transfer unit is configured to, when the input password is identical to the received confirmation password, transfer the received image data from the first storage area into the second storage area.

4. The information processor according to claim 1, further comprising a storage unit,
   wherein the first storage area assigned to the storage controller is secured within the storage unit, and
   wherein the second storage area assigned to the display controller is secured within the storage unit.

5. The information processor according to claim 1,
   wherein the acceptor is configured to, in response to the storage controller storing the received image data into the first storage area, display on the display unit a screen for accepting an input of the display instruction to display the received image data.

6. An image reading system comprising:
   an image reader; and
   an information processor configured to be connected communicably with the image reader,
   wherein the image reader comprises:
      a start instruction acceptor configured to accept a start instruction to start creating image data;
      an image data creator configured to, in response to the start instruction acceptor accepting the start instruction, read an image from a document sheet and create image data based on the read image; and
      an image data transmitter configured to transmit the created image data to the information processor, and
   wherein the information processor comprises:
      a processor-side display unit;
      an image receiver configured to receive the image data transmitted by the image reader;
      a storage controller configured to store the received image data into a first storage area that is assigned to the storage controller;
      an acceptor configured to, in response to the storage controller storing the received image data into the first storage area, accept a display instruction to display the received image data;
      a transfer unit configured to, in response to the acceptor accepting the display instruction, transfer the received image data from the first storage area into a second storage area different from the first storage area; and
      a display controller configured to display, on the processor-side display unit, the received image data stored in the second storage area that is assigned to the display controller;
   wherein the start instruction acceptor is configured to accept the start instruction transmitted by the information processor, and
   wherein the information processor further comprises:
      a request acceptor configured to accept a request to create image data;

a processor-side password creator configured to, in response to the request acceptor accepting the request, create a confirmation password, wherein the processor-side password creator is adapted to create a different confirmation password each time the request acceptor accepts a request to create image data;

a password display controller configured to display the created confirmation password on the processor-side display unit; and a start instruction transmitter configured to, in response to the request acceptor accepting the request, transmit to the image reader the start instruction that is to be accepted by the image reader, wherein the transfer unit is configured to, when the input password is identical to the created confirmation password, transfer the received image data from the first storage area into the second storage area.

7. The image reading system according to claim 6, wherein the transfer unit is configured to, in response to the acceptor accepting the display instruction, perform one of moving the image data stored in the first storage area into the second storage area and copying the image data stored in the first storage area into the second storage area.

8. The image reading system according to claim 6, wherein the information processor further comprises a storage unit, wherein the first storage area assigned to the storage controller is secured within the storage unit, and wherein the second storage area assigned to the display controller is secured within the storage unit.

9. The image reading system according to claim 6, wherein the acceptor is configured to, in response to the storage controller storing the received image data into the first storage area, display on the processor-side display unit a screen for accepting an input of the display instruction to display the received image data.

10. An image reading system comprising:

an image reader; and an information processor configured to be connected communicably with the image reader;

wherein the image reader comprises:
   a start instruction acceptor configured to accept a start instruction to start creating image data;
   an image data creator configured to, in response to the start instruction acceptor accepting the start instruction, read an image from a document sheet and create image data based on the read image; and
   an image data transmitter configured to transmit the created image data to the information processor, and wherein the information processor comprises:
   a processor-side display unit;
   an image receiver configured to receive the image data transmitted by the image reader;
   a storage controller configured to store the received image data into a first storage area that is assigned to the storage controller;
   an acceptor configured to, in response to the storage controller storing the received image data into the first storage area, accept a display instruction to display the received image data;
   a transfer unit configured to, in response to the acceptor accepting the display instruction, transfer the received image data from the first storage area into a second storage area different from the first storage area; and
   a display controller configured to display, on the processor-side display unit, the received image data stored in the second storage area that is assigned to the display controller;

wherein the image reader further comprises:
   a reader-side password creator configured to, in response to the acceptor accepting the start instruction, create a confirmation password, wherein the reader-side password creator is adapted to create a different confirmation password each time the acceptor accepts a start instruction to start creating image data;
   a reader-side display unit configured to display the created confirmation password; and
   a password transmitter configured to transmit the created confirmation password to the information processor, and wherein the information processor further comprises a password receiver configured to receive the confirmation password from the image reader, wherein the acceptor is configured to accept an input password as the display instruction to display the received image, and wherein the transfer unit is configured to, when the input password is identical to the received confirmation password, transfer the received image data from the first storage area into the second storage area.

11. A non-transitory computer readable medium having instructions stored thereon, the instructions, when executed by a processor that is provided with a display unit and configured to be connected communicably with an image reader, causing the processor to perform:

an image receiving step of receiving image data from the image reader;

a storage controlling step of storing the received image data into a first storage area that is assigned to the storage controlling step;

an accepting step of, in response to the received image data being stored into the first storage area in the storage controlling step, accepting a display instruction to display the received image data;

a transferring step of, in response to acceptance of the display instruction in the accepting step, transferring the received image data from the first storage area into a second storage area different from the first storage area;

a display controlling step of displaying, on the display unit, the received image data stored in the second storage area that is assigned to the display controlling step;

a request accepting step of accepting a request to create image data;

a password creating step of, in response to request acceptance of the request in the request accepting step, creating a confirmation password, wherein the password creating step is adapted to create a different confirmation password each time a request to create image data is accepted in the request accepting step;

a password display controlling step of displaying the created confirmation password on the display unit; and a start instruction transmitting step of, in response to acceptance of the request in the request accepting step, transmitting to the image reader a start instruction to start creating image data, wherein the transferring step comprises a step of, when the input password is identical to the created confirmation password, transferring the received image data from the first storage area into the second storage area.

12. The non-transitory computer readable medium according to claim 11,
wherein the transferring step comprises a step of, in response to acceptance of the display instruction in the accepting step, performing one of moving the image data stored in the first storage area into the second storage area and copying the image data stored in the first storage area into the second storage area.

13. The non-transitory computer readable medium according to claim 11,
wherein the instructions further cause the processor to perform a password receiving step of receiving a confirmation password from the image reader,
wherein the accepting step comprises a step of accepting an input password as the display instruction to display the received image, and
wherein the transferring step comprises a step of, when the input password is identical to the received confirmation password, transferring the received image data from the first storage area into the second storage area.

14. The non-transitory computer readable medium according to claim 11,
wherein the processor further comprises a storage unit,
wherein the first storage area assigned to the storage controlling step is secured within the storage unit, and
wherein the second storage area assigned to the display controlling step is secured within the storage unit.

15. The non-transitory computer readable medium according to claim 11,
wherein the accepting step comprises a step of, in response to the received image data being stored into the first storage area in the storage controlling step, displaying on the display unit a screen for accepting an input of the display instruction to display the received image data.

\* \* \* \* \*